June 22, 1937.  T. S. AZZARA ET AL  2,084,884

APPARATUS FOR MANUFACTURING SHOE SOLES

Filed May 12, 1934  4 Sheets-Sheet 1

INVENTOR.
Thomas Santo Azzara
Tamas De Luca
BY
Cornelius Zabriskie
ATTORNEY.

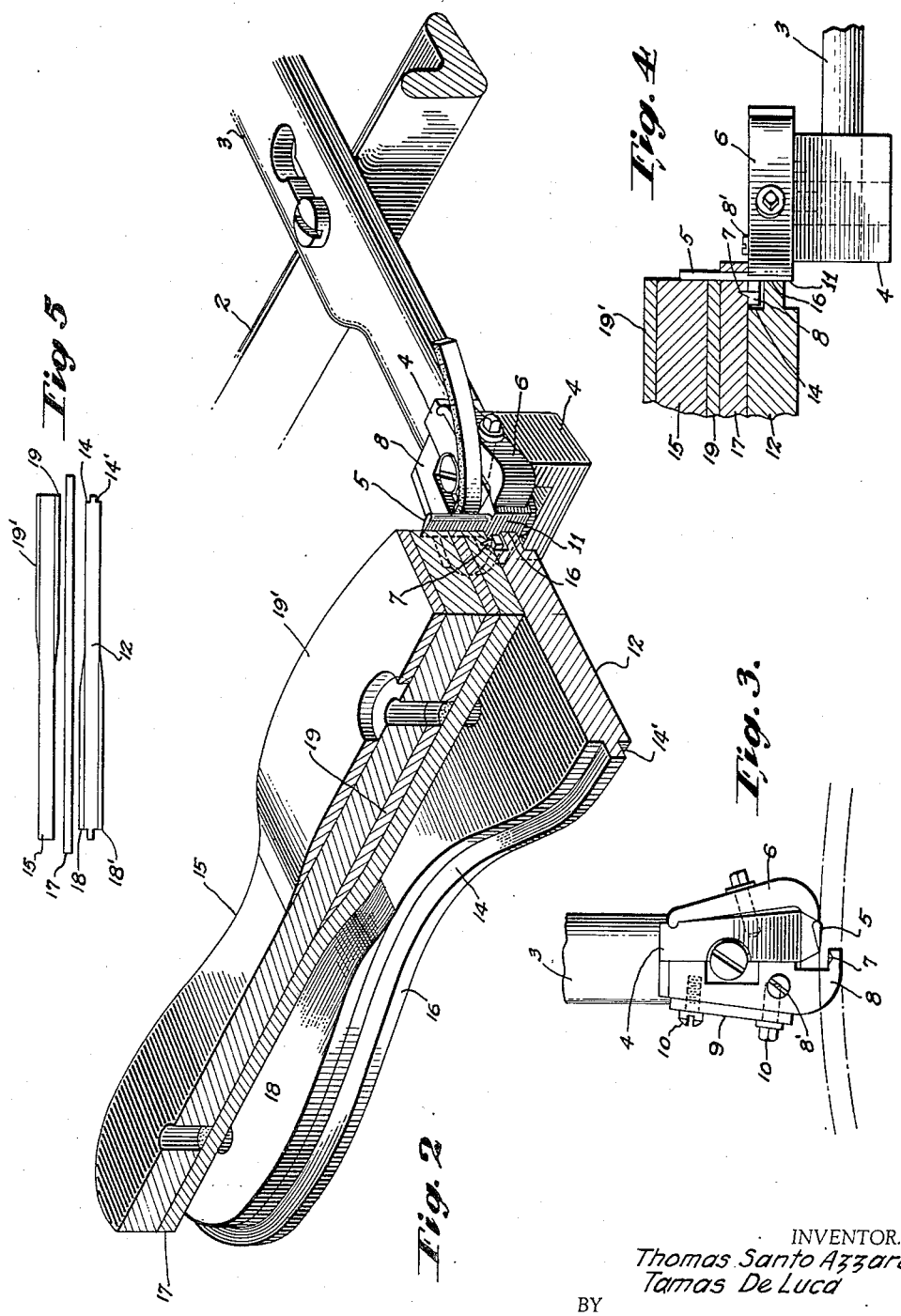

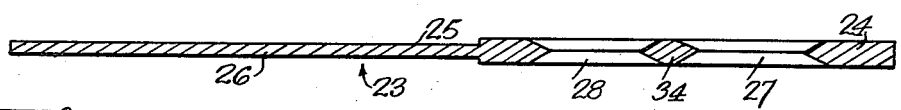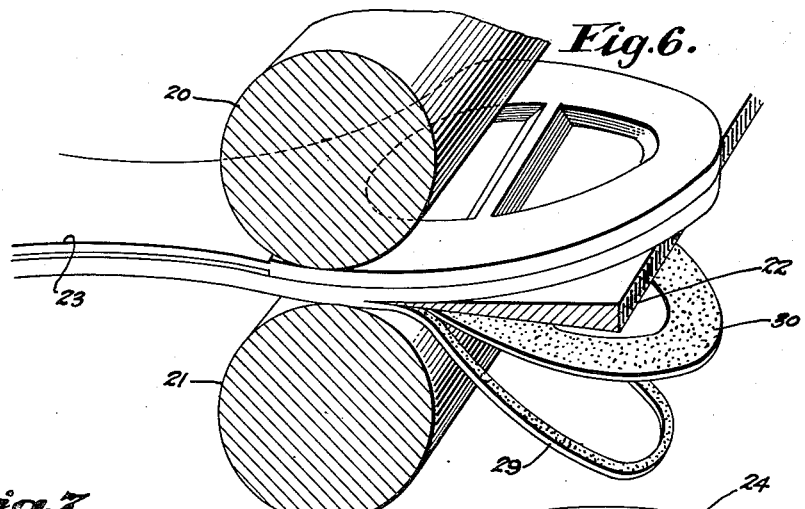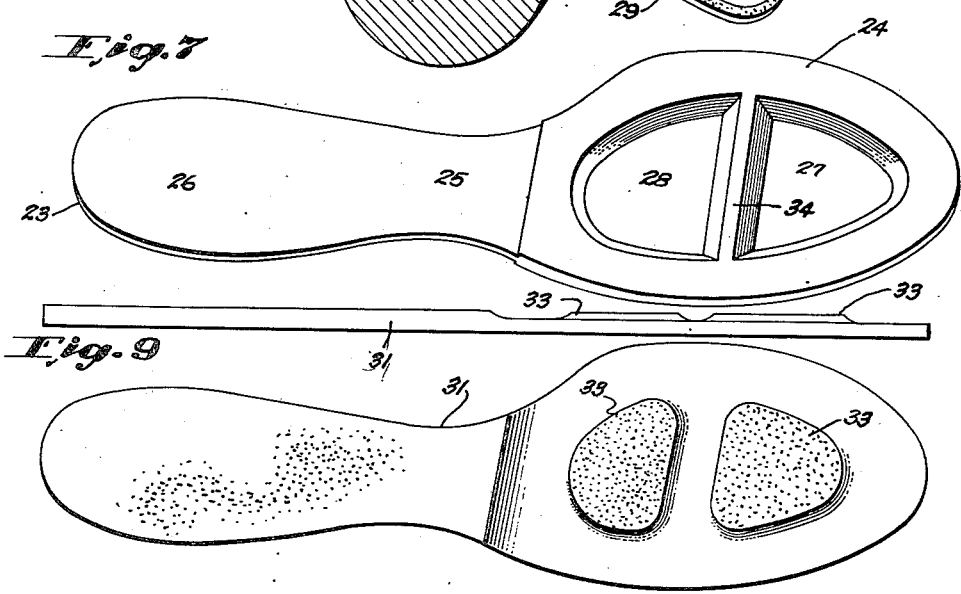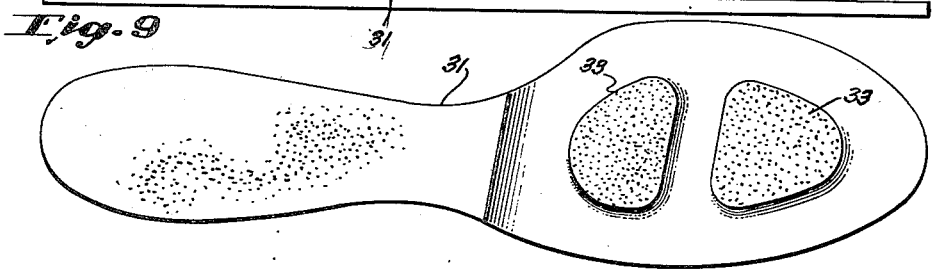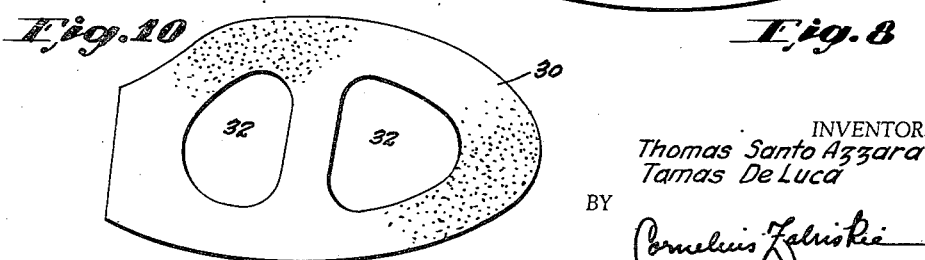

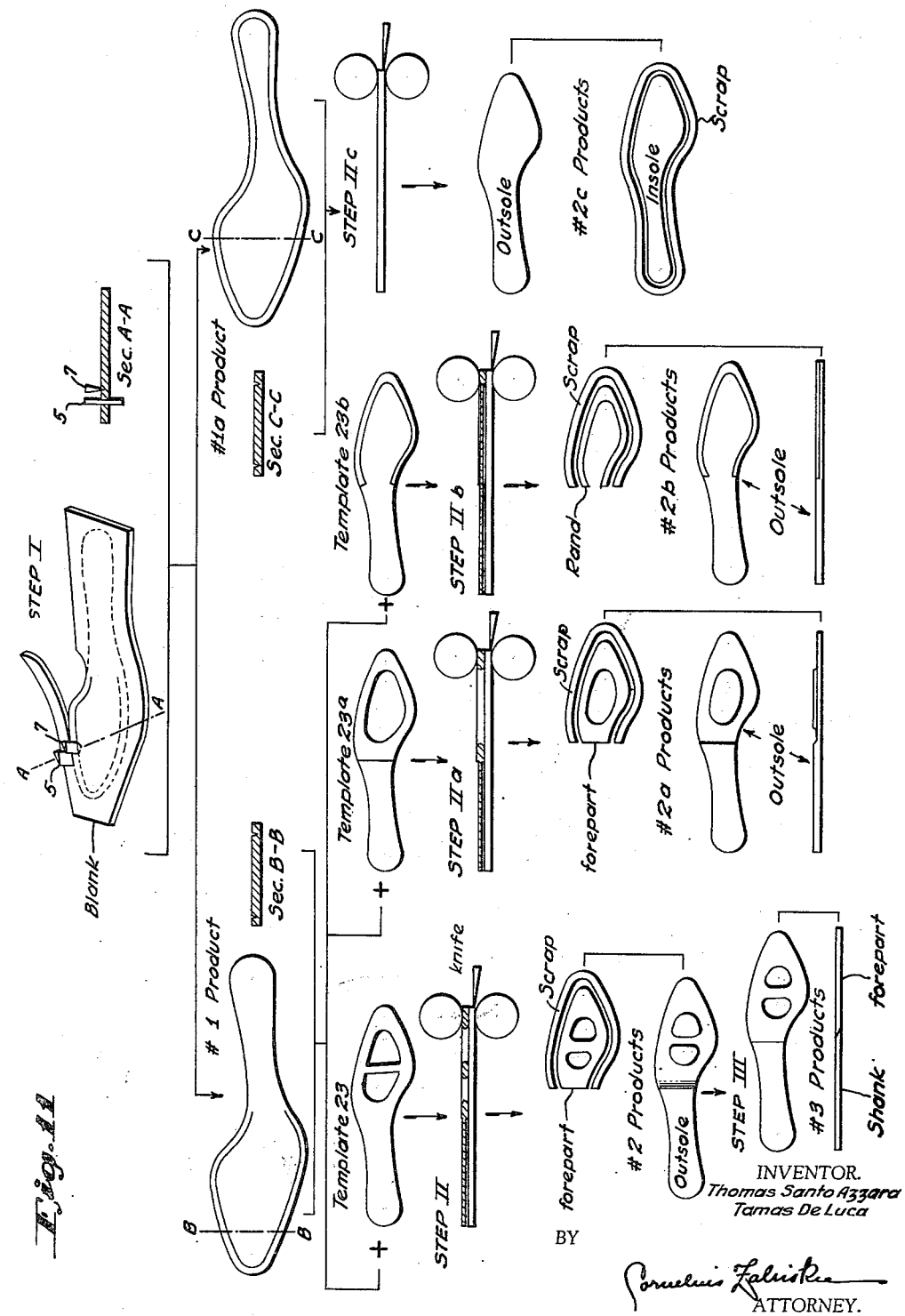

Patented June 22, 1937

2,084,884

UNITED STATES PATENT OFFICE 2,084,884

APPARATUS FOR MANUFACTURING SHOE SOLES

Thomas Santo Azzara, Jamaica, and Tamas De Luca, Brooklyn, N. Y., assignors to Del-Mac Shoe Process Corporation, New York, N. Y., a corporation of New York Application May 12, 1934, Serial No. 725,274

5 Claims. (Cl. 12—17)

This invention relates generally to the art of making shoe soles and is directed, more particularly, to the manufacture of complementary insoles and outsoles from a common blank.

The manufacture of insoles and outsoles from a common blank, usually by splitting the blank to cut the insole from the outsole portion thereof, has been heretofore accomplished, but the methods and apparatus used in this connection have been unsatisfactory for various reasons and more particularly because of the fact that they require a relatively large number of operations and the employment of highly skilled labor. For example, it has been proposed to utilize, as an insole, a marginal forepart rand portion cut from the margin of the ball portion of the outsole, subsequent to the rounding operation of the blank to form the outsole. This practice requires several distinct cutting operations in order to separate the marginal strip which is to serve as the insole and to properly size this marginal strip, for it is to be understood that the insole must in practice be slightly smaller than the outsole in order to allow for the thickness of the upper and thus properly cooperate with the associated outsole. The use of the marginal strip as an insole has not met with commercial success because of the time and labor required in its manufacture and the skill and time required for its use.

The use of such a marginal strip has thus been replaced by a full length insole cut from the outsole by a succession of cutting operations. Among these operations are first the rounding of the blank to form the outsole; next the splitting of the outsole from the heel end to substantially the ball portion of the sole; and thereafter a marginal splitting of the outsole at the ball portion thereof in such manner as to form a slit in the edge of the sole. Thereafter inclined channel cuts are made from the face of the insole to the marginal slit to separate a marginal ball portion and, finally, an inclined transverse slit is made on the line which separates the ball portion and shank portions to intersect the several cuts previously made in the sole and thus free the insole portion from the outsole part. The insole thus made is of the same size as the complementary outsole and must thereafter be cut to a smaller size in order to properly cooperate with the outsole. The operations involved in making soles in this manner are so numerous and require such skill as to be unsatisfactory from a manufacturing standpoint.

The foregoing brief review of prior practice, as carried out in the manufacture of complementary insoles and outsoles from a common blank, is typical, and although other ways of accomplishing this same general result have heretofore been suggested, all of them are open to the same objection, namely, that they require too many manufacturing steps or operations and too much handling and skill to meet the full requirements of the shoe manufacturer.

So far as we are aware, there is no prior known method or apparatus for accomplishing the desired results in a simple, positive, expeditious and economical manner and in such a way that the employment of skilled labor is unnecessary in the accomplishment of this work. It is therefore the object of this invention to provide a method of and apparatus for the manufacture of insoles and outsoles from a common blank by a minimum number of steps and through the use of relatively simple mechanism susceptible of employment by relatively unskilled labor.

As hereinbefore stated, it is necessary in the manufacture of shoes that the insole be slightly smaller in size than the outsole with which it is adapted to cooperate and we have conceived a method and apparatus whereby this sizing of the insole may be accomplished simultaneously with the rounding of the blank to form the outsole. This constitutes an important feature of the present invention because after the insole portion has been removed from the outsole portion of the blank, it is relatively thin and yielding in its character and is difficult to handle and register with cutting machinery. However, as long as it forms an integral part of the outsole blank, it is stiff and sufficiently rigid so that it may be properly handled and operated upon. Consequently by sizing the insole simultaneously with the rounding operation of the blank, absolute accuracy of the related parts must result and at the same time two essential results are obtained in a single manufacturing step.

The present invention, therefore, provides initially the simultaneous sizing of the insole and rounding of the outsole while these parts remain integrally united, and also provides a relatively simple mechanism adapted to be associated with a conventional rounding machine to accomplish this work. The blank thus comes from the rounding machine with the outsole rounded to size and the insole portion thereof also rounded to size, but to such smaller size as is appropriate to cooperate with the outsole after the parts have been separated from one another.

As a second step of the process of this invention, we split the thus rounded assembly to separate the insole and outsole portions and are able to accomplish this result through the employment of a conventional splitting machine. In the event that an insole is desired having a skeletonized forepart, or merely a forepart, in contradistinction to a full length insole, we may employ in this splitting operation a novel template by which we have found it possible to accurately control those portions of the blank which it is desired to split away to form the insole, leaving the remainder of the blank as the outsole. If a full length insole with the forward part skeletonized, is desired, the template may be omitted, but, in any event, the operation of splitting is accomplished as a single manufacturing step and this, taken with the rounding operation, completes the insole-outsole combination in but two manufacturing steps, so carried out as to produce absolute accuracy in the relation of the insole and outsole parts and without requiring the employment of highly skilled labor.

An important practical feature from the shoe manufacturer's viewpoint is that the apparatus employed in carrying out the present invention is relatively simple and is so constituted that it may be used after the manner of attachments or accessories to well known and conventional shoe making machinery found in every shoe factory. The present invention does not require for its operation new, bulky and expensive machines, but permits of the use of attachments or accessories on existing machines to make complementary insole and outsole combinations in two manufacturing steps, which has heretofore been unknown and beyond the highest hopes in this art.

Another object of this invention is to render the method and apparatus flexible and to thereby permit the making of insoles and outsoles of different designs and kinds through a minimum number of manufacturing steps, whereby it is possible to produce structures of the same general character, as heretofore made in a more economical and efficient manner, as well as to produce a novel form of insole presently described. In thus carrying out the present invention, full length or fore-part insoles may be constructed from an outsole blank, or, if desired, merely the ball portion of the insole may be thus made and thereafter associated with a separate, appropriate shank portion, as will be hereinafter fully explained.

The present invention thus includes novel methods and apparatus and also the resulting novel articles of manufacture.

Features of the invention, other than those specified, will be apparent from the hereinafter detailed description and claims when read in conjunction with the accompanying drawings.

The accompanying drawings show a novel method of manufacturing complementary insole and outsole combinations of different kinds, and also various apparatus which may be used in carrying out the method, but it is to be understood that the showing of this method, as well as the apparatus disclosed, is for illustrative purposes, only, and does not define the limits of the invention, the scope of which is commensurate with the appended claims.

Figure 1 is a plan view of a turntable of a conventional rounding machine showing associated operating parts and illustrating in plan view devices according to the present invention associated therewith in the act of rounding a sole blank.

Figure 2 is a fragmental perspective view of a part of the machine shown in Figure 1 and illustrates the knife arm and a portion of the knife arm segment with the rounding knife and the insole sizing knife of this invention associated therewith. Sole patterns made according to the present invention are shown, partly in section and partly in elevation, and an insole blank is illustrated as being rounded.

Figure 3 is a plan view of the knife block embodying this invention.

Figure 4 is a side elevation of the block and associated knives, the sole patterns and sole blank being shown in section.

Figure 5 shows in side elevation the upper and lower sole patterns and an interposed sole free from engagement with one another.

Figure 6 is a fragmental perspective showing, more or less diagrammatically, the manner of splitting the insole and outsole from the common integral blank after the latter has been rounded. In this view, the pressure rolls and knife of a conventional splitting machine are illustrated in section perspective.

Figure 7 is a perspective view of the template shown in use in Figure 6 and Figure 7a is a longitudinal median section thereof.

Figures 8 and 9 are, respectively, plan and side elevations of the outsole resulting from the operation shown in Figure 6.

Figure 10 is a plan view of the insole resulting from the operation shown in Figure 6.

Figure 11 is a schematic or diagrammatic layout showing the method of the present invention when utilized to make complementary insole and outsole combinations of different kinds.

Figure 1:
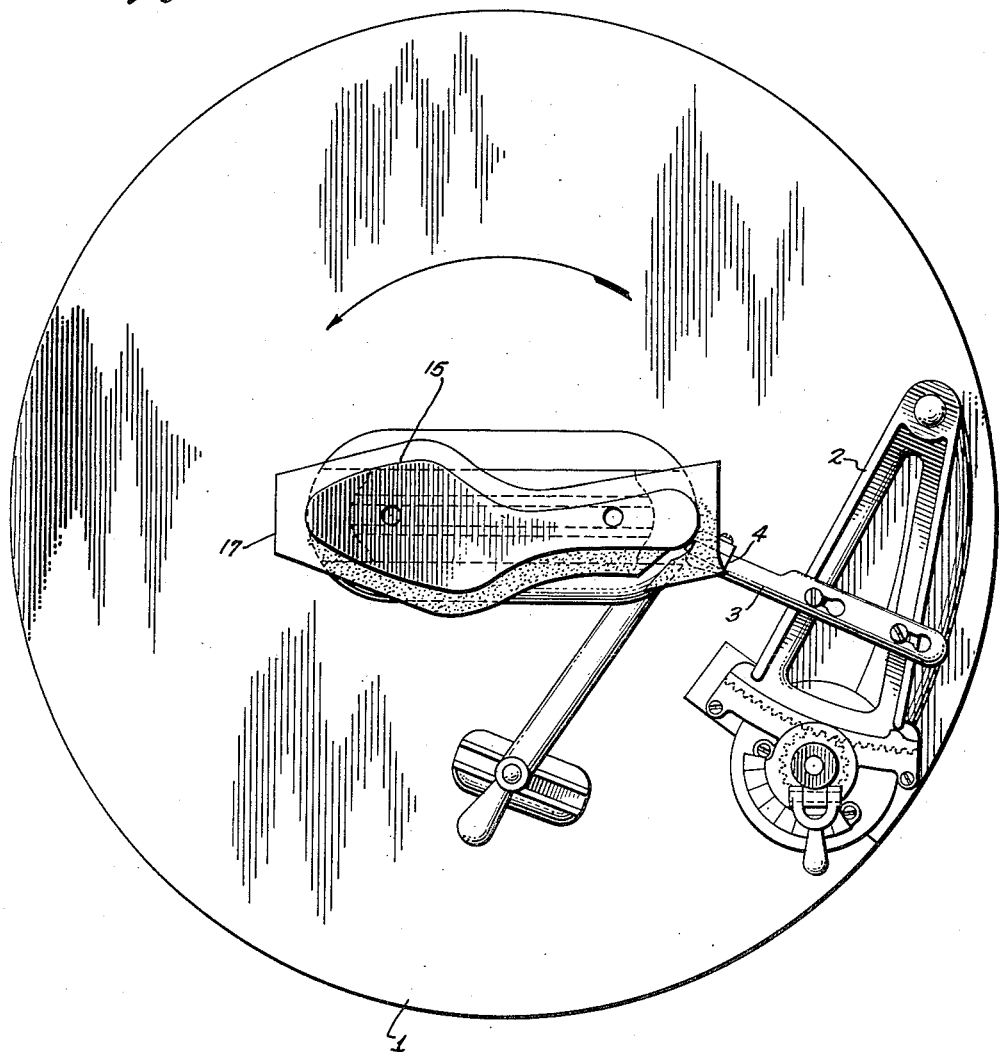

As hereinbefore stated, the present invention is adapted to be used in conjunction with conventional shoe making machinery and we have accordingly, for the purpose of illustration, shown in Figures 1-5, the invention associated with the well known "Planet" sole rounding machine, now in general use, although we wish it clearly understood that the invention is not limited to use in this connection as it may be embodied in a special machine for the purpose or in any other well known sole cutting machine of appropriate design.

As shown, however, in these figures, I designates the turntable having associated therewith the usual knife arm segment 2 and cooperating parts and carrying the knife arm 3 on which is mounted the knife block 4. On this knife block is mounted the conventional rounding knife 5 held in place by the clamp 6. All of the parts thus far described are absolutely conventional in every way.

To incorporate the present invention in a machine of this kind, we mount upon the knife block 4 an additional knife 7, which is in the form of an upstanding spur formed on a plate 8 which plate is adapted to be adjustably secured in rigid position on the knife block by means of a clamp 9 held in place by screws 10, as shown best in Figure 3. The plate 8 is of such shape as to properly support the spur 9 in upstanding position and in radially spaced relation to the rounding knife 5. The spacing will of course vary under different conditions, but for the manufacture of insoles and outsoles for women's dress shoes a spacing of approximately $\frac{1}{16}$ to $\frac{1}{16}$ of an inch is satisfactory, although this may be varied as required by merely loosening the screws 10 and adjusting the plate 8 to the dimension desired, and again tightening the screw 10. Vertical adjustment of knife 7 may be accomplished in the same way by using shims beneath the plate 8 or by manipulating an adjusting screw 8'.

In rounding machines of the character described, the blank from which the sole is cut is adapted to be supported between upper and lower clamping plates, the lower of which constitutes the pattern and determines the shape of the sole to be cut. These clamping plates are clamped in the machine in proximity to the knife block and are held rigidly in position to hold the stock firmly in place while the knife block travels about the periphery of the pattern and against the insole from the blank. During this operation, the face 11 of the rounding knife 5 is held against the periphery of the lower plate or pattern and is guided thereby.

According to the present invention, the same general mode of operation prevails, but inasmuch as the knife 7 projects beyond the face 11 of the rounding knife, it is necessary to cut away or rabbet the lower pattern 12, as shown at 14 in Figure 2. The upper pattern 15, however, need not be rabbeted for obvious reasons. By forming the rabbet 14 in the lower pattern as shown, the forward end of the plate 8 with its knife 7 is adapted to be received into the rabbet with proper clearance, so that these parts do not contact while the face 11 of the rounding knife is guided by the outer peripheral contour 16 of the pattern in the same manner as heretofore to carry out the rounding operation. In order to provide for cutting of both rights and lefts, both faces of the lower pattern are rabbeted, the lower rabbet being indicated by the reference character 14'. Rights and lefts can be cut by simply turning the lower pattern upside down and also turning the upper pattern upside down, while maintaining the lower pattern below and the upper pattern above.

If both patterns 12 and 15 are made of uniform thickness throughout, as is conventionally the case, the knife 7, which we will hereinafter term the insole trimming knife, will cut concurrently with the knife 5, so that the under side of the sole blank 17, clamped between the upper and lower patterns, will be gouged simultaneously with the rounding of the blank and the gouged slit thus produced will be of uniform depth throughout and parallel to the outer contour of the sole thus rounded. If a full length insole is desired, this flat form of clamping pattern will be employed and the knife 7 will be so adjusted that the cut produced thereby will extend into the sole blank from the under side thereof a distance substantially equal to the thickness of the insole to be produced. Thus when the sole has been rounded from the blank and removed, this single operation will produce a rounded sole provided with a slit around its margin and parallel thereto and of a depth equal to the thickness of the desired insole, so that if the product of this operation is passed through a conventional splitting machine, it will split off from the sole thus produced an outsole of full size and an insole of predetermined smaller size absolutely complementary to the outsole, while that narrow portion of the stock between the slit and the overall contour of the outsole will fall away as scrap, as hereinafter more fully explained.

However, in accordance with the preferred form of the present invention, as shown in Figures 1–5, we have illustrated a structure adapted to produce forepart insoles in a novel and efficient way. That is to say, the structure shown in these figures is capable of preparing the sole blank for subsequent splitting of forepart insoles therefrom and which forepart insoles are adapted to be associated with appropriate shank pieces. In order to accomplish this result, it is necessary to limit the effective operation of the insole trimming knife 7 to such parts of the blank as it is desired to utilize as an insole. We have found it entirely feasible and highly practical to accomplish this purpose by so forming the upper and lower pattern clamps that they will slightly deform the insole blank during the rounding operation, to thereby present to the insole trimming knife only those parts of the blank as it may be desired to be cut thereby.

Thus, as shown best in Figures 2 and 5, the shank and heel portion of the bottom pattern is built up or provided with a lift 18 of a height somewhat greater than the effective cutting height of the insole trimming knife 7, while the ball portion of the top pattern is built up or provided with a lift 19 on its under side of corresponding height. These lifts are duplicated on the opposite sides of each of these patterns as indicated at 18' and 19', so that the same patterns can cut rights and lefts. When a sole blank 17 is placed between the top and bottom patterns, this sole blank is perfectly flat, as shown in Figure 5, but as pressure is applied to these patterns to clamp the blank between them, said blank is slightly deformed intermediate its ends, as shown in Figure 2, the deformation being such that it moves the ball portion of the blank down into the plane of the insole trimming knife 7 and at the same time elevates the shank and heel portion of the blank to a plane above the cutting zone of this knife. Consequently, when the blank is clamped in the position shown and the machine operated in the conventional manner of a rounding machine, the rounding knife 5 is sufficiently tall to round the sole throughout, but the insole trimming knife will only gouge the under side of the blank at the ball portion thereof, leaving the shank and heel portions of the blank ungouged or unslit. By this procedure, we are able through proper proportions and placement of the raised and depressed portions of the clamping patterns, to effectually and efficiently control the operations of the knife 7 upon the blank and nevertheless accomplish the rounding of the sole blank and the trimming of the insole portion thereof to size in a single operation and without the employment of highly skilled help. The resulting product comes from the apparatus of Figures 1–5, with the sole rounded to shape and size with the insole portion thereof trimmed to the proper size and contour, but still integrally united with the outsole portion of the blank to be subsequently removed therefrom by splitting in any suitable machine.

The operations thus far described constitute in the alternative the first step of the method of this invention, which may be briefly described as the rounding of a sole blank with simultaneous trimming of the insole portion thereof, while said insole portion remains an integral part of the blank. The sole blank, rounded and gouged as stated, is next passed to the second step of the method, which consists, generally speaking, in separating the blank into complementary insole and outsole portions.

The apparatus for accomplishing this result may vary without departing from the invention and will depend largely upon the manner of cutting by which it is desired to sever these parts. However, in Figures 6–10, we have shown highly practical means for accomplishing this result, together with the product of this operation. In Figure 6, the rolls 20 and 21 are the pressure rolls of the well known "Summit" splitting machine, commonly used in shoe factories for splitting leather. This machine embodies a stationary knife blade 22 positioned in such cooperative relation to the rolls that as the rolls feed leather stock between them under considerable pressure, the stock is fed to the plate which acts upon the stock to split the same in accordance with predetermined adjustments as to thickness of the split. This machine, as such, forms no part of the present invention and no claim is made thereto except in the performance of one step of the method or in conjunction with a template forming an inherent part of the method of this invention. The template to which reference has been made is shown in Figures 6 and 7 and is designated generally by the reference character 23. It is so constructed that when used with a sole blank in a splitting machine, it will cause the splitting machine to cut from said blank an insole portion of skeletonized formation, and, specifically, in the structure shown, a forepart insole portion having cut-outs. To this end, the ball portion 24 of the template is made somewhat thicker than the shank portion 25 and the heel portion 26, and said ball portion is cut away to provide openings 27 and 28. It will be noted that the margins of the openings are bevelled on both sides of the template and that the shank and heel portions are reduced on both sides so that the template may be used for right soles with one side up and for left soles with the other side up. The theory of operation of this template is that the thickened portions will apply sufficient pressure to the blank to force those portions of the blank into cooperative relation with the knife 22, while those portions of the template which are thin or cut away will permit the stock of the blank to recede from the effective plane of cutting of the knife and thus remain uncut. The contour of the template, however, is identical with the contour of the sole blank to be operated upon, so that prior to feeding the stock to the rolls 20 and 21, the template is superimposed on the blank, so as to coincide therewith and the two are simultaneously fed between the rolls with the template on top. All raised portions of the template will produce increased pressure upon the underlying portions of the sole blank and force these portions into cutting relation with the knife, thereby causing these latter portions to be split from the insole blank, as shown in Figure 6.

During this operation, the narrow strip of material 29 which lies between the slit produced by knife 7 and the outer margin of the sole will be cut free and fall away as scrap. Similarly, that portion of the under side of the sole of a thickness corresponding to the depth of the cut previously made by the knife 7, will be cut free and form the part 30 which forms the forepart insole, shown in Figure 10, while the remainder of the sole will be left to form the full length outsole 31, the forward portion of which is recessed, as shown in Figures 8 and 9. It will be noted in this connection that the recess of the outsole is absolutely complementary to the insole forepart 30, except that the periphery of the insole forepart is sufficiently under size to allow for the thickness of the upper. In other words, the insole forepart is complementary to the corresponding part of the outsole, but of just sufficiently smaller size to produce proper lasting. This forepart requires no further trimming off or fitting, but comes from the single manufacturing step of Figure 6, as complete and ready for use.

It will thus appear that we are able by the two manufacturing steps specified to make complementary insole and outsole combinations, properly fitted with respect to one another, and with complementary cut-outs and projections 32, 33, respectively, of such size, shape and number, as may be desired to provide for by using a template 23 of appropriate form. In the event, that it is desired not to skeletonize the forepart 30, i. e., to omit openings, such as shown at 32, the openings 27 and 28 in the template may be omitted, so that the forepart will be solid as it is split from the blank. On the other hand, if a single opening is desired in the forepart blank, the cross bar 34, which separates the openings 27 and 28 may be omitted, as hereinafter more fully explained. One very decided advantage in the splitting of an insole portion from an outsole through the employment of a template as described, consists in the fact that when the edges of the template surrounding the openings 27 and 28 are skeletonized or beveled, as shown, the knife acts upon the stock to produce a cut which leaves no definite mark or change of direction where it intersects with the face of the outsole or the separated insole portion. The cut surfaces merge into one another on a gradual even curve, which, when the parts are subsequently assembled in the manufacture of a shoe, brings about a smooth surface on the inside of a shoe, in contradistinction to certain prior structures of which we are aware, wherein the edges of the complementary insole and outsole are subjected to a flat skiving action, so that if they are not accurately fitted, there is very apt to be a distinct line of demarcation which does not permit of a smooth, uninterrupted surface. The method of accomplishing the result, as stated, therefore, is advantageous as well as efficiently and economically performed.

In carrying out the method of this invention, there are several ways in which the same may be performed to produce end products which differ in structure from one another, and in order that this method may be clearly understood, we have shown a development thereof in a graphical manner in Figure 11 of the accompanying drawings, separating the various parts of the method into steps or stages and illustrating in conjunction therewith the products of the respective steps.

By reference to this figure, it will be noted that step I consists in simultaneously operating upon the sole blank with knives 5 and 7 to round the same and simultaneously gouge the insole portion thereof to size. This step may be so carried on that the knife 7 is effective only during the rounding of the ball portion of the sole in which case #1 product will result. On the contrary, if the knife 7 is operable throughout the entire rounding operation #1a product will result. These two products are susceptible to different manipulations or sub-methods. For example, if #1 product has associated therewith a template 23 and is thereafter passed through step II, which is a splitting step, #2 products will result, which are two in number, and comprise the forepart and an outsole. In practice, this forepart may be associated, in the manufacture of a shoe, directly with the outsole from which it is cut, or step III may be carried out which consists in adding to the forepart a separate shank to provide a #3 product, and this #3 product may be associated with the outsole forming one of the #2 products in completing the shoe.

The sequence of steps embodying steps I and II, just described, may be carried out with the apparatus which we have shown in the preceding figures of the drawings, and it will be noted that #2 products correspond to the forepart and outsole, shown in Figures 8 and 10 of the drawings.

If, however, #1 product is used with a template 23a, and thereupon passed through step IIa, two #2a products will result, namely, a forepart and an outsole adapted to cooperate with one another, but the forepart will be provided with a single opening, in contradistinction to the forepart of the #2 products, which have two openings with a transverse reinforcing and strengthening band.

Furthermore, if #1 product has associated therewith template 23b and is thereupon passed through step IIb, two #2b products will result, namely, a marginal rand and a complementary outsole. The template 23b corresponds in size and shape to the #1 product and is elevated in thickness about the forepart margins over areas corresponding to the marginal scrap and the marginal rand removed from the outsole.

We have thus described several illustrative sub-methods which may be practiced upon #1 product. We have also shown in Fig. 11 one sub-method step that can be practiced upon #1a product. By reference to Figure 11, it will be noted that if this #1a product is passed through step IIc, without the employment of a template, and in this step merely split, after the manner shown in Figure 6, without a template, there will result two #2c products, namely, a flat solid outsole and a flat solid insole, the latter of which is trimmed to size to properly cooperate with the outsole.

It will be noted from the foregoing discussion of the method of this invention, as illustratively shown in Figure 11, that it is susceptible to certain variations, but, in every instance, it is possible to make complementary insole and outsole combinations in but two distinct manufacturing steps. It is true that step III is referred to as following step II in the first described method, but this consists merely in the addition of a shank piece which can be dispensed with if desired.

Important practical advantages of any and all of the embodiments of the methods which we have described are the extreme simplicity of the steps practiced, the simple form of apparatus which may be employed in carrying out these steps, the economy in time and labor saving, handling and operations which are eliminated, and the ability of unskilled labor to carry out the work.

A further important feature of the present invention is that, inasmuch as the insole portion is trimmed to contour and size, while a part of the sole blank, the parts of the resulting insole outsole combination will be accurately sized and shaped with respect to one another and will properly fit when lasted. Moreover, the cutting and sizing by the simultaneous operations specified are so accurately accomplished that it is possible, under quantity production, to manufacture parts of particular sizes in bulk and yet the insole portion cut from one blank is found to properly fit the outsole portion cut from another blank in a corresponding size, so that it is not necessary to keep together the parts split from the same blank as has heretofore been necessary.

The foregoing detailed description sets forth preferred embodiments of the invention and embodies different apparatus and different steps, some of which may be employed in practice without necessarily employing all, and consequently this disclosure is to be understood as illustrative and the invention is to be construed as fully commensurate with the appended claims.

Having thus fully described the invention, what we claim as new and desire to secure by Letters Patent is:

1. In an apparatus for making shoe soles, a sole blank clamp embodying a pair of clamping plates, one of which constitutes the sole pattern and the adjacent surfaces of which plates are complementarily offset in different planes, whereby a sole blank clamped between them has its ball portion positioned in a plane below the shank and heel portion of the blank, a tool carrier mounted in proximity to the sole blank clamp and having an upstanding rounding knife, the operations of which are adapted to be guided by said sole pattern, means for producing relative movement between the sole blank clamp and the tool carrier to cause said rounding knife to round the blank, and an insole trimming knife also mounted on the tool carrier and having its blade positioned in spaced parallel relation to and beyond the rounding knife and in a plane perpendicular to the under face of the depressed ball portion of the sole blank during the rounding of said blank by the rounding knife and to thereby produce in said ball portion of the blank a perpendicular cut of less depth than the thickness of the blank and parallel to the cut of the rounding knife.

2. In an apparatus for making shoe soles, a sole blank clamp embodying a pair of clamping plates, one of which constitutes the sole pattern and the adjacent surfaces of which plate are complementarily offset in different planes, whereby a sole blank clamped between them has its ball portion positioned in a plane below the shank and heel portion of the blank, a tool carrier mounted in proximity to the sole blank clamp and having an upstanding rounding knife, the operations of which are adapted to be guided by said sole pattern, means for producing relative movement between the sole blank clamp and the tool carrier to cause said rounding knife to round the blank, and an insole trimming knife also mounted on the tool carrier in spaced relation to and beyond the rounding knife and in a plane to engage with the under face of the depressed ball portion of the sole blank during the rounding of said blank by the rounding knife and to thereby produce in said ball portion of the blank a cut of less depth than the thickness of the blank and parallel to the cut of the rounding knife, said sole pattern being rabbeted at its outer periphery to permit the insole trimming knife to operate without contact with the pattern.

3. A sole blank clamp for shoe sole making machines embodying a pair of clamping plates, the adjacent faces of which plates are formed complementarily to one another and offset to position the ball portion of a blank clamped between them in a different plane than the shank and heel portion of such blank, said plates being peripherally shaped to correspond to a shoe sole to be cut from a blank clamped between them and the opposite faces of each plate having the same surface contour to permit said plates to be used in the cutting of rights and lefts from blanks positioned between them, through reversal of the plates.

4. A sole blank clamp for shoe sole making machines comprising a pair of clamping plates, each of which consists of a flat body portion of uniform thickness throughout and having a peripheral shape of a sole to be rounded from a blank positioned between them, the ball portion of one of said plates having applied to the opposite faces thereof raised lifts of the same thickness and of corresponding area, and the shank and heel portions of the other plate having applied to the opposite faces thereof raised lifts of the same thickness and of a corresponding area, the lifts of the one plate being of the same height as the lifts of the other plate.

5. In an apparatus for making shoe soles, a sole blank clamp embodying a pair of clamping plates, one of which constitutes the sole pattern and the adjacent surfaces of which plates are complementarily offset in different planes, whereby a sole blank clamped between them has its ball portion positioned in a different plane than the shank and heel portion of the blank, a tool carrier mounted in proximity to the sole blank clamp and having an upstanding rounding knife, the operations of which are adapted to be guided by said sole pattern, means for producing relative movement between the sole blank clamp and the tool carrier to cause said rounding knife to round the blank, and an insole trimming knife also mounted on the tool carrier and having its blade positioned in spaced relation and substantially parallel to the rounding knife and in a plane substantially perpendicular to a face of the sole blank during the rounding of said blank by the rounding knife, and to thereby produce in said blank a substantially perpendicular cut of less depth than the thickness of the blank.

THOMAS SANTO AZZARA.
     TAMAS DE LUCA.